Figure 1:
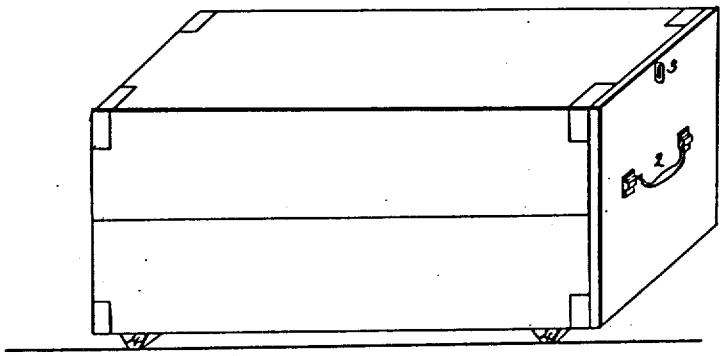
Figure 2:
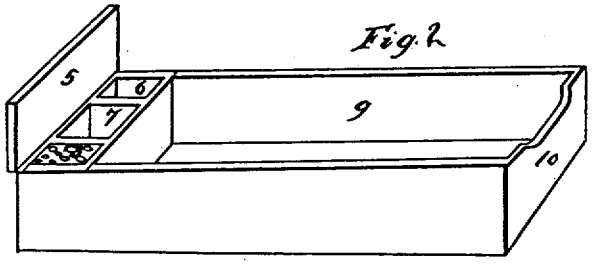
Figure 3:
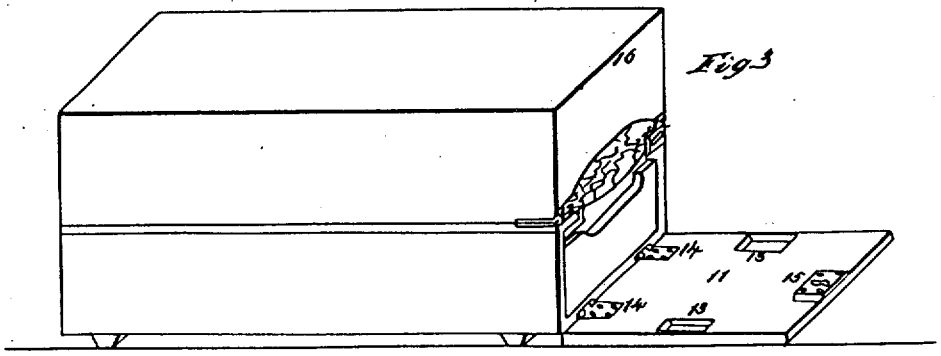
Figure 6:
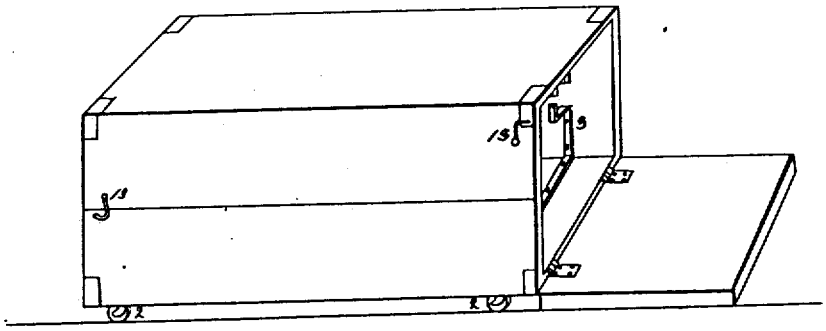
Figure 7:
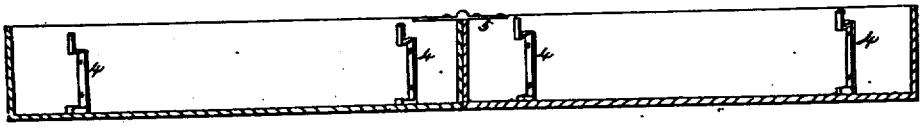
Figure 8:
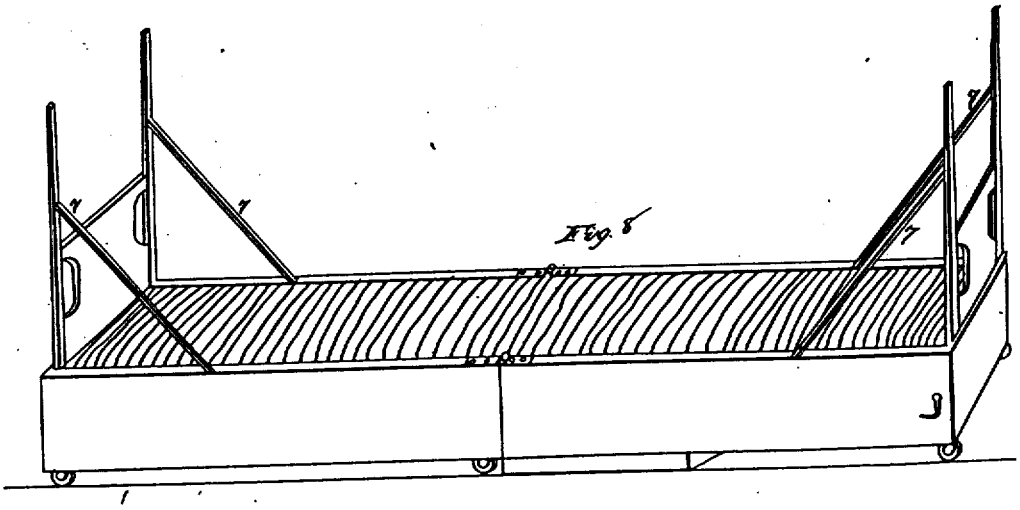
Figure 9:
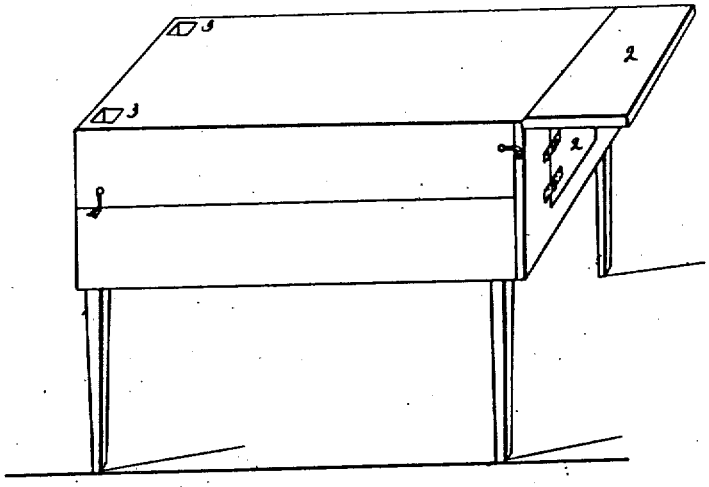
Figure 10:
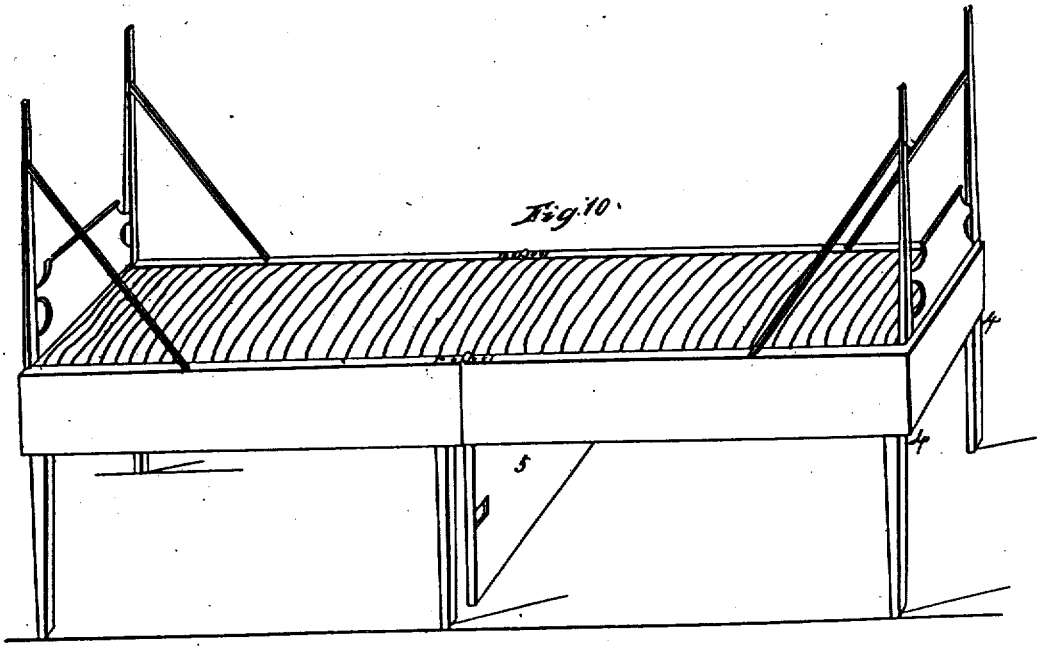

Sheet 1 - 5 Sheets.

8608½X

B. Morris,

Trunk Bedstead,

Patented Jan. 17, 1835.

Sheet 2-5 Sheets.
8608½X
B. Morris,
Trunk Bedstead,
Patented Jan. 17, 1835.
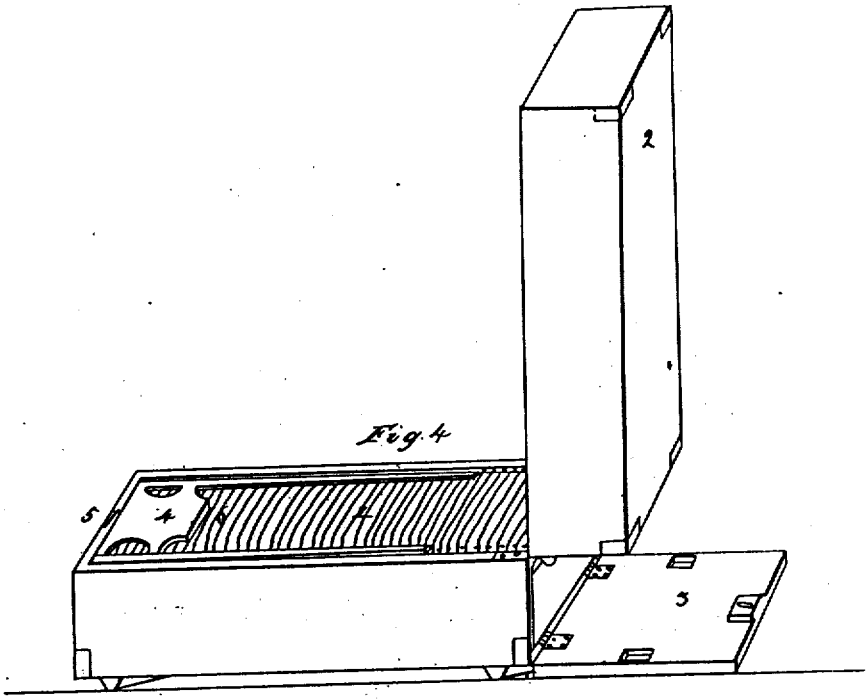
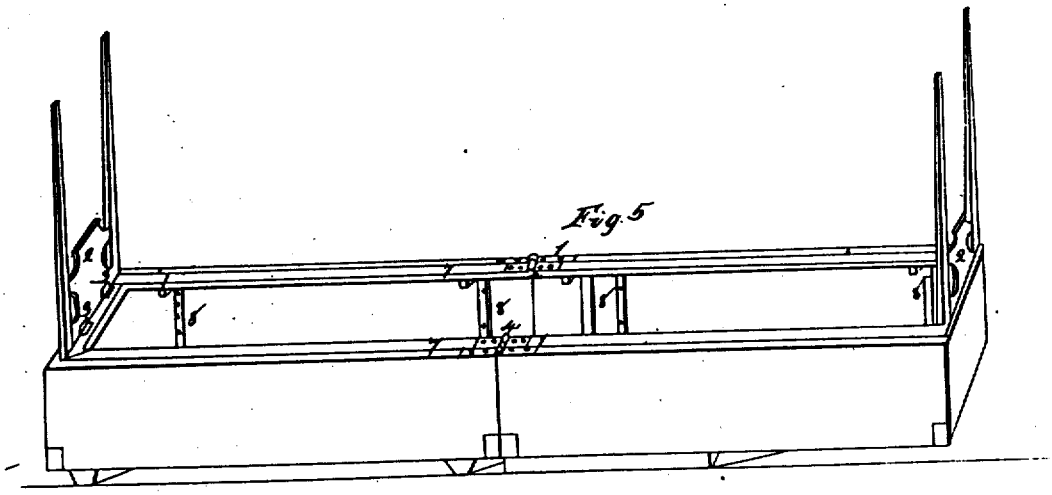

8608½X

B. Morris,

Trunk Bedstead,

Patented Jan. 17, 1835.

Sheet 4-5 Sheets.

8608½X

B. Morris,

Trunk Bedstead,

Patented Jan. 17, 1835.

Sheet 5-5 Sheets.
8608½X
B. Morris,
Trunk Bedstead,
Patented Jan. 17, 1835.
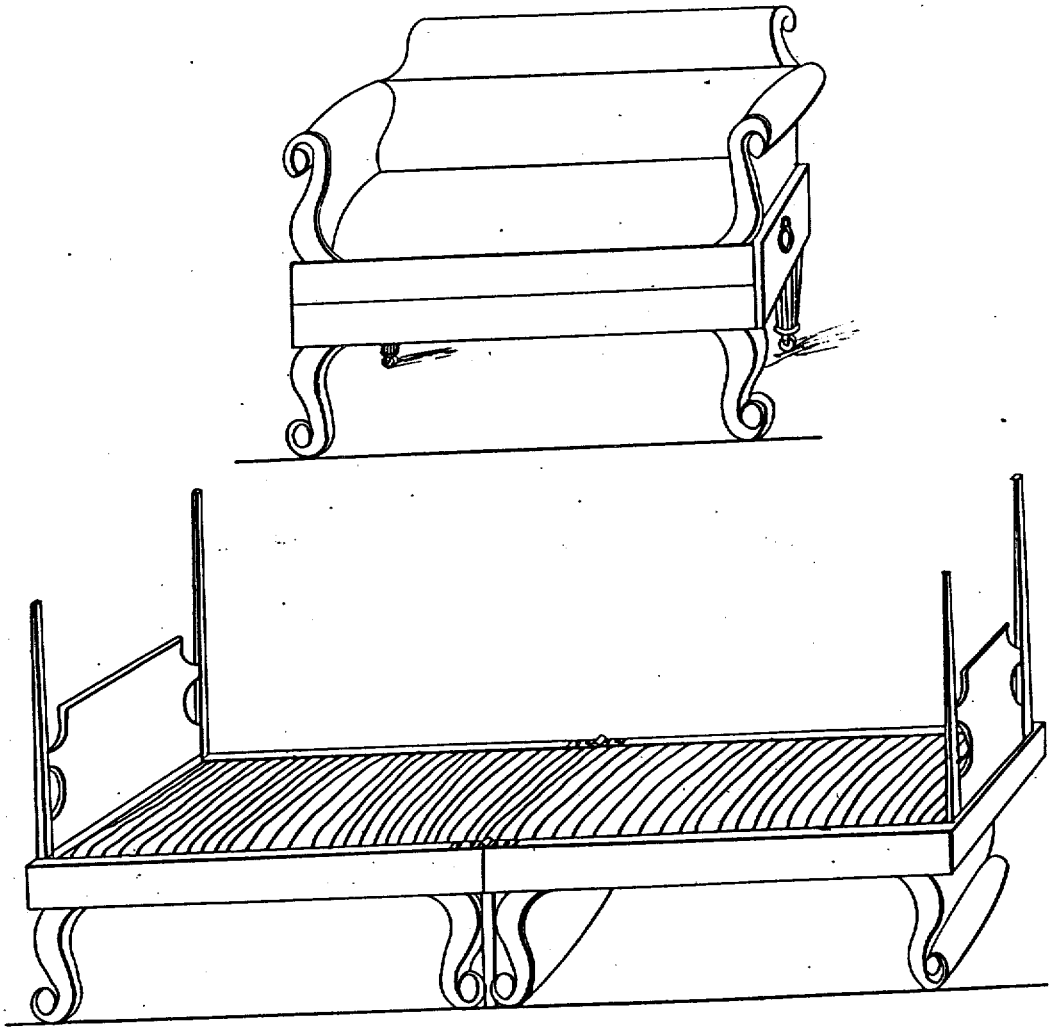

8608½X Benjamin Morris.

Letters Patent.

The Schedule referred to in these Letters Patent and making part of the same, containing a description in the words of the said Benjamin Morris, himself of his Improvement in Trunks and Settees.

---

To all to whom these presents shall come.
Be it known that I, Benjamin Morris, of New Richmond in the County of Clermont, and State of Ohio, have invented a new and useful improvement in Trunk & Settees, and that the following is a full and exact description of the construction & use of the said Trunk, Settee, and Berth combined as invented by me.
The Trunk may be constructed of wood or leather, and when closed, measures three feet two inches in length, two feet two inches in width, and two feet in depth, Being composed of five separate pieces, to wit,– The fall which forms one entire end of the Trunk, and is let down to the floor by means of hinges, by which it is attached to the bottom or lower part of the body & closes against the top or upper part of the body where it is secured by an inside lock. The body consists of two square pieces of equal size, being three feet two inches in length two feet two inches in width, and one foot in depth, one end of each being closed, the other open. so that when the upper and lower parts of the body are folded together by means of the hinges, by which they are attached to each other, at the opposite fall end. The right hand end of the trunk being completely closed and securely fastened by means of [illegible] lock at the centre of the end. The several corners of which are bound with brass or some other material in order that they may be strong and durable. The [illegible] designed to float the trunk [illegible]

8608½X with the additional weight of one hundred and eighty pounds (if the trunk be made of light wood) and is placed in the upper part of the body immediately under the top, being three feet long, two feet wide, and eight inches thick. The drawer is made of light wood with three tills, and lies under the berth being three feet long two feet wide, and eight inches deep.

The Berth and its appendages consist of two rails with a joint in the centre and framed together at the ends with cross pieces to which the head and foot boards, with their uprights for the Musketoe-bar are attached, by means of hinges, and are thereby raised up, and folded down, the uprights folded in rabbets to receive them in the sides of the trunk; by the rails of the Berth. The mattress is nailed to the rails and end pieces which thus form the Berth. The entire Berth when completed rests on eight iron hooks or tenants which serve the double purpose of bracing the sides and bottom of the Trunk, and are so arranged as to enter the like number of mortices in the under sides of the rails and thus support the Berth.

The settee is a convenient seat when folded up being three feet two inches long, from eighteen to twenty four inches wide the back is sixteen inches high, made in two pieces, the upper being seven inches wide and folds down on the lower part which is nine inches wide. The body consists of two pieces of equal size, being four inches deep. The pillars on which it stands are eight inches long, and are placed on castors one inch high, making the whole length of the pillars & castors nine inches. At one end of the settee is a fall which may be let down to the floor by means of rabbets made in the pillars, forming a smooth surface against in which the upper part of the body rests, when the settee is unfolded & the Berth laid open. The construction of the Berth with all its appendages, are precisely the same as those described in the Trunk. The ostensible design of the portable Berth Berth Trunk, is, to accomodate travellers by land & water, but more especially on Steam & Canal Boats; being calculated for a safe conveyance of all such articles as are commonly conveyed in trunks, either by land or sea, affording the proprietor at the same time, not only a comfortable bed, on which he may repose at night, with his property, clothing &c under him, but the means of saving himself & property in case of accidents, such as the sinking, or burning of the Boat in which he is travelling, by floating himself & Trunk to shore, by means of the cork provided for that purpose.

Likewise the Berth, if placed in a case made in the form of the body of the trunk, being three feet two inches long, two feet two inches wide, calculated to contain a Mattress, bed clothes, & Musketoe bar, & when unfolded is the length of a common bed, and designed to be used in Offices, Colegis, & shops, being a neat & convenient piece of furniture.

The Settee is also a neat and convenient piece of furniture and when used as a seat, it occupies but half the space of a common settee, and when unfolded, is a neat and convenient bed, with all the conveniences described above, and is designed for the use of private families, or in the cabins of steam boats, and other crafts, affording a seat by day and a bed at night.

Witnesses
W. R. Price
William Carnes

Benjamin Morris (1077 words)

(Patented January 17, 1835.)

(Drawing)